(12) United States Patent
Roesler et al.

(10) Patent No.: US 7,238,745 B2
(45) Date of Patent: Jul. 3, 2007

(54) AQUEOUS POLYURETHANE/UREA DISPERSIONS CONTAINING ALKOXYSILANE GROUPS

(75) Inventors: Richard R. Roesler, Wexford, PA (US); Lyubov K. Gindin, Pittsburgh, PA (US)

(73) Assignee: Bayer MaterialScience LLC, Pittsburgh, PA (US)

( * ) Notice: Subject to any disclaimer, the term of this patent is extended or adjusted under 35 U.S.C. 154(b) by 92 days.

(21) Appl. No.: 10/736,170

(22) Filed: Dec. 15, 2003

(65) Prior Publication Data

US 2005/0131135 A1   Jun. 16, 2005

(51) Int. Cl.
C08G 18/08   (2006.01)

(52) U.S. Cl. .................. 524/589; 524/588; 524/591; 524/837; 524/839; 524/840

(58) Field of Classification Search .............. 524/588, 524/589, 591, 839, 840, 837; 528/28
See application file for complete search history.

(56) References Cited

U.S. PATENT DOCUMENTS

| | | | |
|---|---|---|---|
| 3,278,456 A | 10/1966 | Starcher et al. ............... 260/2 |
| 3,278,458 A | 10/1966 | Belner ........................ 260/2 |
| 3,278,459 A | 10/1966 | Herold ........................ 260/2 |
| 3,419,533 A | 12/1968 | Dieterich ................. 260/77.5 |
| 3,427,256 A | 2/1969 | Milgrom ................... 252/431 |
| 3,427,334 A | 2/1969 | Belner ...................... 260/429 |
| 3,427,335 A | 2/1969 | Herold ...................... 260/429 |
| 3,479,310 A | 11/1969 | Dieterich et al. .......... 260/29.2 |
| 3,539,483 A | 11/1970 | Keberle et al. ............ 260/29.2 |
| 3,829,505 A | 8/1974 | Herold ................... 260/611 B |
| 3,870,684 A | 3/1975 | Witt et al. .............. 260/75 NH |
| 3,905,929 A | 9/1975 | Noll .................... 260/29.2 TN |
| 3,920,598 A | 11/1975 | Reiff et al. ........... 260/29.2 TN |
| 3,941,849 A | 3/1976 | Herold .................... 260/607 A |
| 4,066,591 A | 1/1978 | Scriven et al. ....... 260/29.2 TN |
| 4,092,286 A | 5/1978 | Noll et al. ........... 260/29.2 TN |
| 4,108,814 A | 8/1978 | Reiff et al. .......... 260/29.2 TN |
| 4,190,566 A | 2/1980 | Noll et al. ........... 260/29.2 TN |
| 4,203,883 A | 5/1980 | Hangauer, Jr. ....... 260/29.2 TN |
| 4,237,264 A | 12/1980 | Noll et al. .................... 528/67 |
| 4,238,378 A | 12/1980 | Markusch et al. ... 260/29.2 TN |
| 4,303,774 A | 12/1981 | Nachtkamp et al. .......... 528/71 |
| 4,345,053 A * | 8/1982 | Rizk et al. .................. 525/440 |
| 4,355,188 A | 10/1982 | Herold et al. ............... 568/620 |
| 4,408,008 A | 10/1983 | Markusch .................... 524/591 |
| 4,472,560 A | 9/1984 | Kuyper et al. .............. 526/120 |
| 4,501,852 A | 2/1985 | Markusch et al. .......... 524/591 |
| 4,701,480 A | 10/1987 | Markusch et al. .......... 523/340 |
| 4,721,818 A | 1/1988 | Harper et al. ............... 568/120 |
| 4,843,054 A | 6/1989 | Harper ....................... 502/175 |
| 5,041,493 A | 8/1991 | Natarajan et al. ........... 524/505 |
| 5,041,494 A * | 8/1991 | Franke et al. ............... 524/588 |
| 5,354,808 A | 10/1994 | Onwumere et al. ......... 524/837 |
| 5,554,686 A | 9/1996 | Frisch, Jr. et al. .......... 524/588 |
| 5,919,860 A | 7/1999 | Roesler et al. ............. 524/838 |
| 5,932,652 A * | 8/1999 | Roesler et al. ............. 524/839 |
| 2003/0191236 A1* | 10/2003 | Buckmann et al. ......... 524/591 |

FOREIGN PATENT DOCUMENTS

| EP | 1 226 813 A2 | 7/2002 |
| WO | 03/011937 A1 | 2/2003 |

OTHER PUBLICATIONS

Advances in Urethane Science & Technology, vol. 10, (month unavailable) 1987, pp. 121-162, James W. Rosthauser and Klaus Nachtkamp, "Waterborne Polyurethanes".

\* cited by examiner

*Primary Examiner*—Edward J. Cain
(74) *Attorney, Agent, or Firm*—Joseph C. Gil; Lyndanne M. Whalen

(57) ABSTRACT

Polyurethane/ureas including hydrophilic moieties and alkoxysilane groups of formula (I)

$$-X-CO-NR^2-Y-Si-(Z)_3 \quad (I)$$

where X is O or $NR^2$; $R^2$ is H, $C_1$-$C_6$ alkyl, substituted $C_1$-$C_6$ alkyl, cycloalkyl, aryl or benzyl; Y is $C_1$-$C_8$ linear and branched alkylene; and Z is an organic group inert to isocyanate groups below 100° C. At least one Z group is an alkoxy group of 1 to 4 carbon atoms. The polyurethane/urea can be in an aqueous dispersion, which can be used to prepare coatings. The dispersion is prepared by (ii) reacting an organic polyisocyanate with a high molecular weight polyol, optionally a low molecular weight isocyanate-reactive compound, an isocyanate-reactive compound containing hydrophilic groups, and/or an amine chain extender forming a prepolymer;

(ii) reacting the prepolymer in (i) with a compound of formula (II)

$$OCN-Y-Si-(Z)_3 \quad (II)$$

where Y and Z are as defined; and (iii) dispersing the reaction product in (II) in an aqueous medium.

13 Claims, No Drawings

AQUEOUS POLYURETHANE/UREA DISPERSIONS CONTAINING ALKOXYSILANE GROUPS

BACKGROUND OF THE INVENTION

1. Field of the Invention

The present invention relates to aqueous polyurethane/urea dispersions and in particular to such dispersions where the polyurethane/urea contains alkoxysilane groups.

2. Description of Related Art

The production of linear or cross-linked aqueous polyurethane-urea dispersions is known as disclosed in U.S. Pat. Nos. 3,479,310; 4,066,591; 4,092,286; 4,108,814; 4,237,264; and 4,238,378 which describe linear polyurethane-ureas and U.S. Pat. Nos. 3,870,684, 4,203,883 and 4,408,008, which describe cross-linked polyurethane-ureas. The aqueous polyurethane-urea dispersions may be used for a wide range of commercial applications such as adhesives or coatings for various substrates including textile fabrics, plastic, wood, glass fibers and metals. Chemical resistance, abrasion resistance, toughness, tensile strength, elasticity and durability are among the many desirable properties of these coatings. In some cases these properties of coatings prepared from aqueous polyurethane-urea dispersions have equaled or even surpassed the performance levels of coatings obtained from solvent-based polyurethane lacquers.

Regardless of the property level which may be obtained for coatings prepared from commercial polyurethane-urea dispersions, there is a continuing need to improve such properties, in particular water resistance, solvent resistance, weather resistance and physical properties such as abrasion resistance. As commercial requirements become more demanding, there is a need in the art to provide adhesives and/or coatings with improved water resistance, solvent resistance, weather resistance, and abrasion resistance.

SUMMARY OF THE INVENTION

The present invention is directed to a polyurethane/urea that includes

A) at least one alkoxysilane group of formula (I)

where

X is selected from O and $NR^2$; each occurrence of $R^2$ is independently selected from H, $C_1$-$C_6$ alkyl, substituted $C_1$-$C_6$ alkyl, cycloalkyl, aryl and benzyl; Y is selected from $C_1$-$C_8$ linear and branched alkylene; and each occurrence of Z is independently selected from organic groups that are inert to isocyanate groups below 100° C., provided that at least one group is an alkoxy group containing from 1 to 4 carbon atoms; and B) hydrophilic moieties.

The present invention is also directed to an aqueous polyurethane/urea dispersion that includes an aqueous medium and a polyurethane/urea that contains at least one alkoxysilane group of formula (I).

The present invention is additionally directed to a method of preparing an aqueous polyurethane/urea dispersion including:

(i) preparing a prepolymer having at least one isocyanate-reactive group by reacting an organic diisocyanate with a high molecular weight polyol, optionally a low molecular weight isocyanate-reactive compound, optionally an isocyanate-reactive compound containing hydrophilic groups, and optionally an amine chain extender;

(ii) reacting the prepolymer in (i) with a compound of formula (II)

where Y and Z are as defined above; and (iii) dispersing the reaction product in (II) in an aqueous medium.

The present invention further provides coatings prepared from these aqueous polyurethane/urea dispersions described above.

DETAILED DESCRIPTION OF THE INVENTION

Other than in the operating examples, or where otherwise indicated, all numbers or expressions referring to quantities of ingredients, reaction conditions, etc., used in the specification and claims are to be understood as modified in all in instances by the term "about." Various numerical ranges are disclosed in this patent application. Because these ranges are continuous, they include every value between the minimum and maximum values. Unless expressly indicated otherwise, the various numerical ranges specified in this application are approximations.

Embodiments of the present provide a polyurethane/urea that includes

A) at least one alkoxysilane group of formula (I)

where

X is selected from O and $NR^2$; each occurrence of $R^2$ is independently selected from H, $C_1$-$C_6$ alkyl, substituted $C_1$-$C_6$ alkyl, cycloalkyl, aryl and benzyl; Y is selected from $C_1$-C8 linear and branched alkylene; and each occurrence of Z is independently selected from organic groups that are inert to isocyanate groups below 100° C., provided that at least one group is an alkoxy group containing from 1 to 4 carbon atoms; and B) hydrophilic moieties.

In a particular embodiment of the invention, in the polyurethane/urea that includes at least one alkoxysilane group of formula (I), $R^2$ is H.

Other embodiments of the present provide an aqueous polyurethane/urea dispersion that includes a) an aqueous medium and b) a polyurethane/urea that includes a polyurethane/urea that includes at least one alkoxysilane group of formula (I) as described above.

As used herein the terms "hydrophilic moieties" and "hydrophilic groups" refer to substituent and/or pendant groups on a polyurethane/urea that improve the compatibility, dispersibility, and/or solubility of the polyurethane/urea with and/or in water and/or an aqueous medium. Non-limiting examples of hydrophilic moieties and/or groups that can be used in the present invention are described below and include polyether groups, which typically include repeat units derived from ethylene oxide, and/or ionic groups, i.e., anionic or cationic groups.

As used herein the term "aqueous medium" refers to a solution that contains water and, optionally, suitable solutes that can be used to effectuate desired properties in a solution and/or dispersion of the inventive polyurethane/urea. Suitable solutes are described below and can include, as non-limiting examples, salts, surfactants, dispersing agents, stabilizing agents, rheology modifiers, and other additives known in the art.

As used herein, the term "reactive silane group" refers to a silane group containing at least two alkoxy or acyloxy groups as defined by substituent "Z". A silane group containing two or three alkoxy and/or acyloxy groups is considered to be one reactive silane group.

As used herein, the term "urethane" refers to a compound containing one or more urethane and/or urea groups. Non-limiting examples of urethanes that can be used in the invention include compounds that contain one or more urethane groups and optionally contain urea groups as well as compounds contain both urethane and urea groups.

As used herein the term "alkyl" refers to a monovalent radical of an aliphatic hydrocarbon chain of general formula $C_sH_{2s+1}$, where s is the number of carbon atoms, or ranges therefore, as specified. The term "substituted alkyl" refers to an alkyl group, where one or more hydrogens are replaced with a non-carbon atom or group, non-limiting examples of such atoms or groups include halides, amines, alcohols, oxygen (such as ketone or aldehyde groups), and thiols.

As used herein the term "cycloalkyl" refers to a monovalent radical of an aliphatic hydrocarbon chain that forms:a ring of general formula $C_sH_{2s-1}$, where s is the number of carbon atoms, or ranges therefore, as specified. The term "substituted cycloalkyl" refers to a cycloalkyl group, containing one or more hetero atoms, non-limiting examples being —O—, —NR—, and —S— in the ring structure, and/or where one or more hydrogens are replaced with a non-carbon atom or group, non-limiting examples of such atoms or groups include halides, amines, alcohols, oxygen (such as ketone or aldehyde groups), and thiols. R represents an alkyl group of from 1 to 24 carbon atoms.

As used herein, the term "aryl" refers to a monovalent radical of an aromatic hydrocarbon. Aromatic hydrocarbons include those carbon based cyclic compounds containing conjugated double bonds where 4t+2 electrons are included in the resulting cyclic conjugated pi-orbital system, where t is an integer of at least 1. As used herein, aryl groups can include single aromatic ring structures, one or more fused aromatic ring structures, covalently connected aromatic ring structures, any or all of which can include heteroatoms. Non-limiting examples of such heteroatoms that can be included in aromatic ring structures include O, N, and S.

As used herein, the term "alkylene" refers to acyclic or cyclic divalent hydrocarbons having a carbon chain length of from $C_1$ (in the case of acyclic) or $C_4$ (in the case of cyclic) to $C_{25}$, typically $C_2$ to $C_{12}$, which may be substituted or unsubstituted, and which may include substituents. As a non-limiting example, the alkylene groups can be lower alkyl radicals having from 1 to 12 carbon atoms. As a non-limiting illustration, "propylene" is are intended to include both n-propylene and isopropylene groups; and, likewise, "butylene" is intended to include both n-butylene, isobutylene, and t-butylene groups.

As used herein, the term "oxyalkylene" refers to an alkylene group containing one or more oxygen atoms. The term "aralkylene" refers to a divalent aromatic group, which may be ring-substituted. The term "alkylene aryl" refers to any acyclic alkylene group containing at least one aryl group, as a non-limiting example, phenyl.

Aqueous polyurethane dispersions containing alkoxysilane groups are known and disclosed, e.g., in U.S. Pat. Nos. 5,041,494, 5,354,808, 5,932,652, 5,919,860, and 5,554,686.

In an embodiment of the invention, the at least one alkoxysilane group of the polyurethane/urea includes from 0.5 to 6 wt. % of the polyurethane/urea. In a further embodiment, Z is a group according to the formula —O—$R^1$, where $R^1$ is selected from $C_1$-$C_5$ linear and branched alkyl.

In a particular embodiment of the invention, the hydrophilic moieties in the polyurethane/urea include one or more groups selected from lateral and terminal chains containing alkylene oxide units, cationic groups and anionic groups. Further to this embodiment, non-limiting examples of the alkylene oxide units can be repeat units derived from ethylene oxide, non-limiting examples of cationic groups can include amine groups neutralized with an acid, and non-limiting examples of anionic groups can include carboxylate groups neutralized with a tertiary amine, sodium, potassium, and/or lithium ion.

In an embodiment of the invention, alkoxysilane groups are advantageously incorporated into polyurethane/ureas to provide stable dispersions having higher siloxane group contents than when the siloxane groups are incorporated through primary amino groups. The alkoxysilane groups provide reactive silane groups.

In an embodiment of the invention, the polyurethane/urea that includes at least one alkoxysilane group is prepared by reacting a suitable compound that contains at least one suitable isocyanate reactive group with a compound that contains at least one isocyanate group and at least one alkoxysilane group. Suitable isocyanate reactive groups include, but are not limited to —OH, —$NH_2$, —$NHR^2$, and —SH, where $R^2$ is as defined above.

Further to this embodiment, the suitable compound containing isocyanate reactive groups can be a reaction product. As a non-limiting example, the reaction product containing isocyanate reactive groups can be prepared by reacting a mixture of polyols, in some cases diols, and optionally monools, providing an excess of hydroxyl groups with diisocyanates and optionally monoisocyanates to form a hydroxyl-containing reaction product containing OH prepolymers and monools formed by the reaction of one mole of a diol with one mole of the optional monoisocyanate. In a particular embodiment, the diols and monools are polyethers.

Suitable diisocyanates which may be used to prepare the polyurethane/ureas are known and include, but are not limited to, organic diisocyanates represented by the formula, $R^{10}(NCO)_2$. Suitable monoisocyanates are represented by the formula H $R^{10}$NCO. In each instance, $R^{10}$ independently represents an organic group obtained by removing the isocyanate groups from an organic diisocyanate having a molecular weight of from about 112 to 1,000 in some cases from about 140 to 400.

In an embodiment of the invention, the diisocyanates are those represented by the above formula in which $R^{10}$ represents a divalent aliphatic hydrocarbon group having from 4 to 18 carbon atoms, a divalent cycloaliphatic hydrocarbon group having from 5 to 15 carbon atoms, a divalent aralphatic hydrocarbon group having from 7 to 15 carbon atoms or a divalent aromatic hydrocarbon group having 6 to 15 carbon atoms.

Further to this embodiment, the suitable organic diisocyanates can include 1,4-tetramethylene diisocyanate, 1,6-hexamethylene diisocyanate, 2,2,4-trimethyl-1,6-hexamethylene diisocyanate, 1,12-dodecamethylene diisocyanate, cyclohexane-1,3- and -1,4-diisocyanate, 1-isocyanato-2-isocyanatomethyl cyclopentane, 1-isocyanato-3-isocyanatomethyl-3,5,5-trimethyl-cyclohexane (isophorone diisocyanate or IPDI), bis-(4-isocyanato-cyclohexyl)-methane, 1,3- and 1,4-bis-(isocyanatomethyl)-cyclohexane, bis-(4-isocyanatocyclohexyl)-methane, 2,4'-diisocyanato-dicyclohexyl methane, bis-(4-isocyanato-3-methyl-cyclohexyl)-methane, α,α, α',α'-tetramethyl-1,3- and/or -1,4-xylylene diisocyanate, 1-isocyanato-1-methyl-4(3) cyclohexane, 2,4- and/or 2,6-hexahydro-toluylene diisocyanate, 1,3- and/or 1,4-phenylene diisocyanate, 2,4- and/or 2,6-toluylene diisocyanate, 2,4- and/or 4,4'-diphenylmethane diisocyanate and 1,5-diisocyanato naphthalene and mixtures thereof.

In some embodiments of the invention, small amounts, i.e., up to 5%, in some cases from 0.1% to 5%, and in other cases from 0.5% to 3.5% based on the weight of total isocyanate containing compounds, of optional polyisocyanates containing 3 or more isocyanate groups can be used. Non-limiting examples of suitable polyisocyanates that can be used include 4-isocyanatomethyl-1,8-octamethylene diisocyanate and aromatic polyisocyanates such as 4,4',4"-triphenylmethane triisocyanate and polyphenyl polymethylene polyisocyanates obtained by phosgenating aniline/formaldehyde condensates.

In a particular embodiment of the invention, the diisocyanates include bis-(4-isocyanatocyclohexyl)-methane, 1,6-hexamethylene diisocyanate and isophorone diisocyanate, especially bis-(4-isocyanatocyclohexyl)-methane and isophorone diisocyanate.

Embodiments of the invention provide that the polyols are one or a mixture of polyester polyols, polyether polyols, polyhydroxy polycarbonates, polyhydroxy polyacetals, polyhydroxy polyacrylates, polyhydroxy polyester amides and polyhydroxy polythioethers. Particular embodiments provide that the polyols are one or more of polyester polyols, polyether polyols and polyhydroxy polycarbonates.

Many embodiments of the invention will use diols as the polyols, however, other embodiments of the invention will optionally include polyols that contain three or more hydroxyl groups as part of the mixture of polyols. When polyols that contain three or more hydroxyl groups are used, they are included in the mixture of polyols at a level of up to 10%, in some cases from 0.1% to 10%, and in other cases from 1% to 7.5% based on the total hydroxyl equivalents in the mixture of polyols.

Non-limiting examples of suitable polyester polyols include reaction products of polyhydric, preferably dihydric alcohols to which trihydric alcohols may be added and polybasic, preferably dibasic carboxylic acids. Instead of these polycarboxylic acids, the corresponding carboxylic acid anhydrides or polycarboxylic acid esters of lower alcohols or mixtures thereof may be used for preparing the polyesters. The polycarboxylic acids can be aliphatic, cycloaliphatic, aromatic and/or heterocyclic and they can be substituted, e.g. by halogen atoms, and/or unsaturated. Non-limiting examples of suitable polycarboxylic acids include succinic acid; adipic acid; suberic acid; azelaic acid; sebacic acid; phthalic acid; isophthalic acid; trimellitic acid; phthalic acid anhydride; tetrahydrophthalic acid anhydride; hexahydro-phthalic acid anhydride; tetrachlorophthalic acid anhydride, endomethylene tetrahydrophthalic acid anhydride; glutaric acid anhydride; maleic acid; maleic acid anhydride; fumaric acid; dimeric and trimeric fatty acids such as oleic acid, which may be mixed with monomeric fatty acids; dimethyl terephthalates and bis-glycol terephthalate. Non-limiting examples of suitable polyhydric alcohols include, e.g. ethylene glycol; propylene glycol-(1,2) and -(1,3); butylene glycol-(1,4) and -(1,3); hexanediol-(1,6); octanediol-(1,8); neopentyl glycol; cyclohexanedimethanol (1,4-bis-hydroxymethyl-cyclohexane); 2-methyl-1,3-propanediol; 2,2,4-trimethyl-1,3-pentanediol; triethylene glycol; tetraethylene glycol; polyethylene glycol; dipropylene glycol; polypropylene glycol; dibutylene glycol and polybutylene glycol, glycerine and trimethlyolpropane.

In an embodiment of the invention, the polyesters can contain a portion of carboxyl end groups. Polyesters of lactones, e.g., caprolactones or hydroxycarboxylic acids, e.g. hydroxycaproic acids, can also be used.

Suitable polycarbonates containing hydroxyl groups include those known per se such as the products obtained from the reaction of diols such as propanediol-(1,3), butanediol-(1,4) and/or hexanediol-(1,6), diethylene glycol, triethylene glycol or tetraethylene glycol with phosgene, diarylcarbonates such as diphenylcarbonate or with cyclic carbonates such as ethylene or propylene carbonate. Also suitable are polyester carbonates obtained from the above-mentioned polyesters or polylactones with phosgene, diaryl carbonates or cyclic carbonates.

Suitable polyols for preparing the inventive polyurethane/urea include polyether polyols, in many cases diols, having a number average molecular weight of at least 500, in some cases at least 1000 and in other cases at least 2000. Also, the number average molecular weight of the polyether polyol can be up to 20,000, in some cases up to 15,000 and in other cases up to 12,000. The number average molecular weight of the polyether polyol can vary and range between any of the values recited above.

In an embodiment of the invention, the polyethers have a maximum total degree of unsaturation of 0.1 milliequivalents/g (meq/g) or less, in some cases less than 0.04 (meq/g) in other cases less than 0.02 meq/g, in some situations less than 0.01 meq/g, in other situations 0.007 meq/g or less, and in particular situations 0.005 meq/g or less. The amount of unsaturation will vary depending on the method used to prepare the polyether as well as the molecular weight of the polyether. Such polyether diols are known and can be produced by, as a non-limiting example, the propoxylation of suitable starter molecules. As another non-limiting example, minor amounts (up to 20% by weight, based on the weight of the polyol) of ethylene oxide can be used. If ethylene oxide is used, it is preferably used as the initiator for or to cap the polypropylene oxide groups. Non-limiting examples of suitable starter molecules include diols such as ethylene glycol, propylene glycol, 1,3-butanediol, 1,4-butanediol, 1,6 hexanediol and 2-ethylhexanediol-1,3. Also suitable are polyethylene glycols and polypropylene glycols.

Suitable methods for preparing polyether polyols are known and are described, for example, in EP-A 283 148 and U.S. Pat. Nos. 3,278,457, 3,427,256, 3,829,505, 4,472,560, 3,278,458, 3,427,334, 3,941,849, 4,721,818, 3,278,459, 3,427,335, and 4,355,188.

In addition to the polyether polyols, minor amounts (up to 20% by weight, based on the weight of the polyol) of low molecular weight dihydric and trihydric alcohols having a molecular weight 32 to 500 can also be used. Suitable examples include ethylene glycol, 1,3-butandiol, 1,4-butandiol, 1,6-hexandiol, glycerine or trimethylolpropane.

It is also possible in accordance with embodiments of the present invention to use aminopolyethers instead of the polyether polyols. The aminopolyethers may be prepared by aminating the corresponding polyether polyols in known manner. In an embodiment of the invention, the aminopolyethers are those available under the trade name JEFFANMINE®, available from Huntsman Chemical Co., Austin, Tex.

In an embodiment of the invention, combinations of the above-described processes can be used to provide both polyether monools and monoisocyanates in the isocyanate-containing reaction products.

In an embodiment of the invention, the compound containing isocyanate reactive groups is prepared by reacting an isocyanate component with a compound containing at least one isocyanate reactive group at an NCO:isocyanate reactive group equivalent ratio of at least 1:1.5, in some cases at least 1:1.8, and in other cases at least 1:1.9. Also, the NCO:isocyanate reactive group equivalent ratio can be up to 1:2.5, in some cases up to 1:2.2 and in other cases up to 1:2.1. In some situations, the NCO:isocyanate reactive group equivalent ratio is 1:2. The NCO:isocyanate reactive group ratio can vary in a range between any of the values recited above. In an embodiment of the invention, one mole of the isocyanate component is reacted for each equivalent of isocyanate reactive groups.

In a further embodiment of the invention, the reaction product is prepared from a diisocyanate, a monoisocyanate, and a diol at an NCO:OH equivalent ratio of 1:2. In this embodiment, the reaction mixture contains the 1/2 adduct of the diisocyanate and diol; minor amounts of higher molecular weight oligomers, such as the 2/3 adduct; a monool, which is the 1/1 adduct of the diol and monoisocyanate; non-functional polymers, which are formed by the reaction of two molecules of the monoisocyanate with one molecule of the diol; various products containing both diols and monools; and a minor amount of unreacted diol.

In another embodiment of the invention, the polyurethane/urea that includes at least one alkoxysilane group is formed by reacting the above-described compound containing isocyanate reactive groups with compounds containing isocyanate and reactive silane groups. The reaction is carried out at an equivalent ratio of isocyanate groups to isocyanate-reactive groups of at least 1:0.8, and in some cases at least 1:0.9. Also the reaction can be carried out at an equivalent ratio of isocyanate groups to isocyanate-reactive groups of up to 1:1.1 and in some cases up to 1:1.05. In some situations, the reaction can be carried out at an equivalent ratio of isocyanate groups to isocyanate-reactive groups of 1:1. The reaction can be carried out at any value or can range between any values of equivalent ratio of isocyanate groups to isocyanate-reactive groups recited above.

In an embodiment of the invention, the reaction temperature during prepolymer production is maintained below about 150° C., in some cases between about 50° and 130° C., and in other cases between about 50° and 100° C. The reaction is continued until the content of unreacted isocyanate groups (or isocyanate-reactive groups) decreases to the theoretical amount or slightly below. The finished prepolymer typically has a free isocyanate group (or isocyanate-reactive group) content of about 1 to 20%, in many cases about 1 to 10% by weight, based on the weight of prepolymer solids.

In a further embodiment of the invention, the prepolymers may be prepared in the presence of one or more solvents, provided that the solvents are substantially nonreactive in the context of the isocyanate-polyaddition reaction. Non-limiting examples of suitable solvents include dimethylformamide, esters, ethers, ketoesters, ketones, e.g., methyl ethyl ketone and acetone, glycol-ether-esters, chlorinated hydrocarbons, aliphatic and alicyclic hydrocarbon-substituted pyrrolidinones, e.g., N-methyl-2-pyrrolidinone, hydrogenated furans, aromatic hydrocarbons and mixtures thereof.

In a particular embodiment of the invention, the solvents are present in the final aqueous polyurethane/urea dispersion at a level of less than 5 wt. %, in some cases less than 2 wt. %, in other cases less than 1 wt. % and in some situations less than 0.5 wt. % of the aqueous polyurethane/urea dispersion.

In an additional embodiment of the invention, in addition to the preceding organic solvents, silicon-containing reactive diluents can be used as solvents or reactive diluents during the production of the prepolymers and for the resulting coating compositions. Examples of such reactive diluents include tetramethoxy silane, tetraethoxy silane, methyl triethoxy silane, methyl trimethoxy silane, ethyl triethoxy silane, octyl triethoxy silane and dimethyl diethoxy silane.

The use of these reactive diluents can provide important benefits. As a non-limiting example, the coating compositions can contain less environmentally regulated organic solvent. As another non-limiting example, the reactive diluent can also act as a co-reactant for the polyurethane/urea dispersion to provide a composition with increased inorganic character. Coatings prepared from such compositions have different performance properties when compared to coatings prepared from compositions that do not contain such reactive diluents.

In a particular embodiment of the invention, the polyether urethanes can also be prepared by reacting an excess of diols with aminosilanes to form a monool and then reacting the resulting monool with a mixture of polyisocyanates (polyisocyanates, diisocyanates, and/or monoisocyanates) to form the polyether urethanes.

In a further embodiment of the present invention, the polyurethane/urea obtained according to the process of the present invention contains polyether urethanes, which contain two or more, in many cases two, reactive silane groups, and polyether urethanes, which contain one reactive silane group. Also present are polymers, which are the reaction products of unreacted compounds containing isocyanate reactive groups with aminosilanes. The latter polymers, in many cases, are present in an amount of less then 5% by weight, in some situations less than 2.5% by weight, and in other situations, less than 1% by weight.

In an embodiment of the invention, the polyurethane/urea includes at least 0.5%, in some cases at least 1%, another cases at least 1.5%, and in some situations at least 2% alkoxysilane groups based on the weight of the polyurethane/urea. Also, the polyurethane/urea includes up to 6%, in some cases up to 5%, in other cases up to 4.5% and in some situations up to 4% of alkoxysilane groups based on the weight of polyurethane/urea. The level of alkoxysilane groups in the polyurethane/urea can be or can range between any of the values recited above.

In an embodiment of the invention, the polyurethane/urea is rendered water-dispersible or water-soluble by the incorporation or inclusion of hydrophilic moieties along or pendant from the polyurethane/urea chain. The presence of the hydrophilic groups enable the polyurethane/urea to be stably dispersed in an aqueous medium. Non-limiting examples of suitable hydrophilic groups include ionic or potential ionic groups and/or lateral or terminal, hydrophilic ethylene oxide units that are chemically incorporated into the polyurethane/urea.

Any suitable hydrophilic moiety can be used for this purpose. Suitable hydrophilic moieties include, but are not limited to anionic groups, cationic groups and alkylene oxide groups.

In an embodiment of the invention, the hydrophilic groups include moieties derived from ethylene oxide units, or repeat units therfrom. In this embodiment, the ethylene oxide derived moieties are present at a level of at least 1 percent, in some cases 2 percent, and in other cases up to 3 percent based on the weight of the polyurethane/urea. Also, the ethylene oxide derived moieties can be present at a level of up to 10 percent, in some cases up to 8 percent, in other cases up to 6 percent and in some situations up to 5 percent based on the weight of the polyurethane/urea. The ethylene oxide derived moieties can be present at any recited level or can range between any value recited above.

In an embodiment of the present invention, the polyurethane/urea includes chemically incorporated anionic groups at a level of at least 10, in some cases at least 20, and in other cases at least 25 and in some situations at least 35 meq. per 100 grams of polyurethane/urea. Also, the polyurethane/urea includes chemically incorporated anionic groups at a level of up to 120, in some cases up to 100, in other cases up to 80 and in some situations up to 60 meq. per 100 grams of polyurethane/urea. The polyurethane/urea can include chemically incorporated anionic groups at a level represented by any of the values or can range between any of the values recited above.

In a particular embodiment of the present invention, the chemically incorporated anionic groups are suitable salts of acid groups. Further to this embodiment, the acid group in the acid salt can be, as non-limiting examples, carboxylic acid groups, sulfonic acid groups, and phosphonic acid groups. In a specific embodiment, the anionic groups include carboxylate groups, where the carboxylic acid groups make up at least 50 mol %, in some cases at least 70 mol %, in other cases at least 80 mol %, in some situations at least 90 mol %, in other situations at least 95 mol % and in particular situations at least 99 mol % of the anionic groups in the polyurethane/urea. Still further to this embodiment, the acid salt includes as a counter ion or cation, amines, including primary, secondary, and tertiary amines, ammonia, and/or alkali metal ions. In a particular embodiment, at least 80 wt. % of the anionic groups are neutralized with tertiary amines. In a more particular embodiment, 80 wt. % of the anionic groups are carboxylate groups neutralized with tertiary amines.

In an embodiment of the present invention, the polyurethane/urea includes hydrophilic moieties at a level of at least 0.1%, in some cases at least 1%, in other cases at least 2% and in some situations at least 3% by weight, based on the weight of polyurethane/urea. Also, the polyurethane/urea includes hydrophilic moieties at a level of up to 10%, in some cases up to 9%, in other cases up to 8%, in some situations up to 6% and in other situations up to 5% by weight, based on the weight of polyurethane/urea. The level of hydrophilic moieties included in the polyurethane/urea can be any level represented by any of the values or can range between any of the values recited above.

In a particular embodiment, the hydrophilic moieties are selected from lateral and terminal chains containing alkylene oxide units. As used herein, the term "alkylene oxide" refers to divalent hydrocarbons having a carbon chain length of from $C_1$ to $C_6$, which further include one or more ether oxygen atoms in the alkylene chain, non-limiting examples being the polyether segments derived from ethylene oxide, propylene oxide and butylene oxide. In a specific embodiment of the invention, the alkylene oxide units are ethylene oxide.

In an embodiment of the present invention, the polyurethane/urea includes chemically incorporated cationic groups at a level of at least 10, in some cases at least 20, and in other cases at least 25 and in some situations at least 35 meq. per 100 grams of polyurethane/urea. Also, the polyurethane/urea includes chemically incorporated cationic groups at a level of up to 120, in some cases up to 100, in other cases up to 80 and in some situations up to 60 meq. per 100 grams of polyurethane/urea. The polyurethane/urea can include chemically incorporated cationic groups at a level represented by any of the values or can range between any of the values recited above.

In a particular embodiment of the present invention, the chemically incorporated cationic groups are suitable salts of amine and/or onium groups. Further to this embodiment, the onium group in the salt can be, as non-limiting examples, quaternary ammonium groups, phosphonium groups and sulfonium groups having a halide and/or methyl sulfate counter ion. As non-limiting examples, the amines can be primary, secondary and/or tertiary amines neutralized with an inorganic acid. In a specific embodiment, the cationic groups include amine groups neutralized with an inorganic acid, where the amine groups make up at least 50 mol %, in some cases at least 70 mol %, in other cases at least 80 mol %, in some situations at least 90 mol %, in other situations at least 95 mol % and in particular situations at least 99 mol % of the anionic groups in the polyurethane/urea. Still further to this embodiment, the inorganic acid can be selected from HCl, HBr, $H_2SO_4$, phosphoric acid and phosphorous acid. In a more particular embodiment, 80 wt. % of the cationic groups are amine groups neutralized with an inorganic acid.

Suitable compounds for incorporating the carboxylate, sulfonate and quaternary nitrogen groups are described in U.S. Pat. Nos. 3,479,310, 4,108,814 and 4,303,774, the disclosures of which are herein incorporated by reference. Suitable compounds for incorporating tertiary sulfonium groups are described in U.S. Pat. No. 3,419,533, also incorporated by reference. Suitable neutralizing or quaternizing agents for converting the potential anionic groups to anionic groups either before, during or after their incorporation into the polyurethane/ureas, are tertiary amines, alkali metal cations or ammonia. Examples of these neutralizing agents are disclosed in U.S. Pat. Nos. 4,501,852 and 4,701,480, which are incorporated by reference. Preferred neutralizing agents are the trialkyl-substituted tertiary amines and include triethyl amine, N,N-dimethyl-ethanol amine, triethanol amine and N-methyl-diethanol amine. Suitable neutralizing agents for converting potential cationic groups to cationic groups are disclosed in U.S. Pat. Nos. 3,479,310 and 3,419,533, which are incorporated by reference.

In an additional embodiment, up to 75%, in some cases up to 50%, of the allowable, chemically incorporated, hydrophilic groups can be replaced by the known nonionic, external emulsifiers such as those of the alkaryl type such as polyoxyethylene alkyl ethers, polyoxyethylene nonyl phenyl ether or polyoxyethylene octyl phenyl ether; those of the alkyl ether type such as polyoxyethylene lauryl ether or polyoxyethylene oleyl ether; those of the alkyl ester type such as polyoxyethylene laurate, polyoxyethylene oleate or polyoxyethylene stearate; and those of the polyoxyethylene benzylated phenyl ether type.

An embodiment of the present invention provides a method of preparing an aqueous polyurethane/urea dispersion that includes:
  (i) preparing a prepolymer having at least one isocyanate-reactive group by reacting an organic polyisocyanate with a compound containing an one or more isocyanate reactive groups selected from —OH, —NH$_2$, and —SH, optionally a low molecular weight isocyanate-reactive compound, and optionally an amine chain extender, wherein one or both of the polyisocyanate and the compound containing isocyanate reactive groups optionally contain hydrophilic moieties; and (ii) reacting the prepolymer in (i) with a compound of formula (II):

$$OCN—Y—Si—(Z)_3 \quad (II)$$

where Y and Z are as defined above; and (iii) dispersing the reaction product in (II) in an aqueous medium.

In an embodiment of the invention, the compound of formula (II) is incorporated into the polyurethane/urea in an amount of at least 0.5 percent, in some cases 1 percent, in other cases at least 1.5 percent, and in some situations at least 2 percent based on the weight of alkoxysilane groups as a percentage of (i) and (ii). Also, the compound of formula (II) is incorporated into the polyurethane/urea in an amount of up to 6 percent, in some cases up to 5.5 percent, in other cases up to 5 percent, in some situations up to 4.5 percent and in other situations up to 4 percent based on the weight of alkoxysilane groups as a percentage of (i) and (ii). The compound of formula (II) can be incorporated into the polyurethane/urea at any level or can range between any of the levels recited above.

In an embodiment of the invention, the isocyanate-reactive compound containing hydrophilic groups is present in an amount such that the polyurethane/urea includes chemically incorporated anionic groups as described above at the levels recited above. Further, the polyurethane/urea can contain hydrophilic moieties selected from lateral and terminal chains containing alkylene oxide units at the levels recited above.

In an additional embodiment, the isocyanate-reactive compound containing hydrophilic groups is present in an amount such that the polyurethane/urea includes chemically incorporated cationic groups as described above at the levels recited above.

As used herein, the term "neutralizing agents" is meant to embrace all types of agents which are useful for converting potential ionic groups to ionic groups.

In an embodiment of the invention, the carboxylate groups for incorporation into the polyurethane/urea in either the one-step or two-step process are derived from hydroxy-carboxylic acids of the general formula:

$$(HO)_xQ(COOH)_y$$

where Q represents a straight or branched, alkyl or aralkyl radical containing 1 to 12 carbon atoms, and x and y represent integers from 1 to 3. Non-limiting examples of such hydroxy-carboxylic acids include citric acid and tartaric acid.

In a particular embodiment of the invention, the carboxylate groups for incorporation into the polyurethane/urea acids are those of the above-mentioned formula wherein x=2 and y=1. These dihydroxy alkanoic acids are described in U.S. Pat. No. 3,412,054, herein incorporated by reference. The preferred group of dihydroxy alkanoic acids are the dimethylol alkanoic acids represented by the structural formula $$Q'—C(CH_2OH)_2—COOH$$

wherein Q' is hydrogen or an alkyl group containing 1 to 8 carbon atoms. The most preferred compound is dimethylol propionic acid, i.e., when Q' is methyl in the above formula.

When incorporating the anionic or potential anionic groups through a chain extender used to convert the prepolymer to the polyurethane/urea in the second step of the two-step process, it is preferred to use amino functional compounds containing anionic or potential anionic groups such as the diamino carboxylic acids or carboxylates disclosed in U.S. Pat. No. 3,539,483 or salts of 2,6-diaminohexanoic acid. When sulfonate groups are desired they may be incorporated through the chain extenders using salts of isothionic acid or diamino sulfonates of the formula $$H_2N—A—NH—B—SO_3^-$$

where A and B represent aliphatic hydrocarbon radicals containing 2 to 6 carbon atoms, typically ethylene groups.

Whether the ionic groups are incorporated into the polyurethane/urea via the prepolymer or the chain extender is not critical. Therefore, the ionic groups may exclusively be incorporated via the prepolymer or via the chain extender or a portion of the ionic groups can be introduced according to each alternative. However, it is preferred to introduce the ionic groups via the prepolymer since this allows a wider range of process variations in preparing a polyurethane/urea dispersion.

Suitable compounds for incorporating the lateral or terminal, hydrophilic ethylene oxide units may be either monofunctional or difunctional in the context of the isocyanate-polyaddition reaction and include, but are not limited to:

i) diisocyanates which contain lateral, hydrophilic ethylene oxide units, ii) compounds which are difunctional in the isocyanate-polyaddition reaction and contain lateral, hydrophilic ethylene oxide units, iii) monoisocyanates which contain terminal, hydrophilic ethylene oxide units, iv) compounds which are monofunctional in the isocyanate-polyaddition reaction and contain terminal, hydrophilic ethylene oxide units, and v) mixtures thereof.

Examples of such compounds are disclosed in U.S. Pat. Nos. 3,905,929, 3,920,598 and 4,190,566, the disclosures of which are herein incorporated by reference. In an embodiment of the invention, the hydrophilic components are the monohydroxy polyethers having terminal hydrophilic chains containing ethylene oxide units. These hydrophilic components may be produced as described in the preceding patents by alkoxylating a monofunctional starter, such as methanol or n-butanol, using ethylene oxide and optionally another alkylene oxide, for example propylene oxide.

In an embodiment of the invention, a sufficient amount of the potential ionic groups must be neutralized so that when combined with the hydrophilic ethylene oxide units and optional external emulsifiers, the polyurethane/urea final product will be a stable dispersion. In many cases, at least about 75%, and in some cases at least about 90%, of the potential ionic groups are neutralized to the corresponding ionic groups. The conversion of the potential ionic groups to ionic groups is conducted in known manner, e.g., as described in the preceding patents setting forth suitable neutralizing agents.

In a particular embodiment of the invention, the prepolymer is NCO-group terminated (NCO prepolymer) and can be reacted with amines either as chain terminators or chain extenders. As a non-limiting exemplary method of reacting the NCO prepolymers with amino group-containing compounds, the prepolymer is dispersed in water and then the prepolymer is reacted with amino group-containing compounds, which can be mixed with water either before, during or after dispersing the NCO prepolymer.

In an embodiment of the invention, branching of the polyurethane/urea can be obtained by using compounds having an amine functionality of greater than 2.

In a particular embodiment the NCO prepolymers are reacted with components, which can have an average amine functionality, i.e., the number of amine nitrogens per molecule, of about 2 to 6, more preferably about 2 to 4 and most preferably about 2 to 3. The desired functionalities can also be obtained by using mixtures of polyamines.

Suitable amines are include, but are not limited to hydrocarbon polyamines containing 2 to 6 amine groups which have isocyanate-reactive hydrogens according to the Zerewitinoff test, e.g., primary or secondary amine groups. The polyamines can be aromatic, aliphatic or alicyclic amines and contain 1 to 30 carbon atoms, preferably 2 to 15 carbon atoms, and more preferably 2 to 10 carbon atoms. Such polyamines can contain additional substituents provided that they are not as reactive with isocyanate groups as the primary or secondary amines.

Non-limiting examples of polyamines include those disclosed in U.S. Pat. No. 4,408,008, herein incorporated by reference. Specific non-limiting examples of polyamines that can be used in the invention include ethylene diamine, 1,6-hexane diamine, 1,2- and 1,3-propane diamine, the isomeric butane diamines, 1-amino-3-aminomethyl-3,5,5-trimethyl cyclohexane, bis-(4-aminocyclohexyl)-methane, bis-(4-amino-3-methylcyclohexyl)-methane, xylylene diamine, $\alpha,\alpha,\alpha',\alpha'$-tetramethyl-1,3- and/or -1,4-xylylene diamine, 1-amino-1-methyl-4(3)-aminomethyl cyclohexane, 2,4- and/or 2,6-hexahydrotoluylene diamine, hydrazine, diethylene triamine, triethylene tetramine, tetraethylene pentamine, pentaethylene hexamine.

In a particular embodiment of the invention the polyamines are selected from 1-amino-3-aminomethyl-3,5,5-trimethylcyclohexane (isophorone diamine or IPDA), bis-(4-amino-cyclohexyl)-methane, bis-(4-amino-3-methylcyclohexyl)-methane, 1,6-diaminohexane, hydrazine, ethylene diamine, diethylene triamine, triethylene tetramine, tetraethylene pentamine and pentaethylene hexamine.

The amount of amino group-containing compounds to be used in accordance with the present invention is dependent upon the number of isocyanate groups in the NCO prepolymer. Generally, the ratio of isocyanate groups to amino groups is 1.0:0.6 to 1.0:1.1, in some cases 1.0:0.8 to 1.0:0.98 on an equivalent basis.

The reaction between the NCO prepolymer and the amino group-containing compounds is generally conducted at temperatures of 5 to 90° C., in some cases 20 to 80° C., and in other cases 30 to 60° C. The reaction conditions are normally maintained until the isocyanate groups are essentially completely reacted.

In an embodiment of the invention, the prepolymers can be converted into aqueous polyurethane/urea dispersions in accordance with methods known in polyurethane chemistry and described, e.g., in "Waterborne Polyurethanes," Rosthauser et al, Advances in Urethane Science and Technology, Vol. 10, pg. 121-162 (1987).

In an embodiment of the invention, the polyurethane/ureas can be dispersed in water by either an inverse process or a direct process. In the direct process water is added to the polyurethane/urea to initially form a water-in-oil emulsion, which after passing through a viscosity maximum, is converted into an oil-in-water emulsion. In the inverse process the polyurethane/urea is added to water, which avoids the need to pass through the viscosity maximum.

Even though more energy is required for preparing a dispersion by the direct process, it may be necessary to use this process if the viscosity of the polymer is too high to add the polyurethane/urea to water. A high viscosity polymer is often obtained when a fully reacted polyurethane/urea is prepared in the organic phase, especially when only small amounts of solvent are used.

In an embodiment of the invention, in the direct or inverse process, chain extending amines are present in the water to complete the transformation of an isocyanate prepolymer in to polyurethane/urea. The solvent remains in the dispersion as a coalescing aide.

In an alternative embodiment of the invention, the chain extention is completed, in the direct or inverse process, in a solvent solution, as a non-limiting example, acetone. In this embodiment, the solvent disperses the solution in water and then the solvent is removed leaving a dispersion with zero solvent.

In an embodiment of the invention, the resulting polyurethane/urea aqueous dispersion is a stable, aqueous dispersion of polyurethane/urea particles having a solids content of at least 15%, in some cases at least 20%, in other cases at least 25% and in some situations at least 30% by weight. Also, the aqueous dispersion has a solids content of up to 60%, in some cases up to 55%, in other cases up to 50%, and in some situations up to 45% by weight. However, it is always possible to dilute the dispersions to any minimum solids content desired. In an embodiment of the invention, the solids in the inventive aqueous dispersion can be any value or range between any values recited above.

In an embodiment of the invention, the average particle size of the polyurethane/urea particles in the aqueous dispersion is at least 0.001 microns, in some cases at least 0.01 microns. Further, the average particle size of the polyurethane/urea particles in the aqueous dispersion is not more than 100 microns, in some cases not more than 50 microns, and in other cases not more than 25 microns. Smaller particle sizes enhance the stability of the dispersed particles and also lead to the production of films with high surface gloss. The average particle size of the polyurethane/urea particles in the aqueous dispersion can be any value or range between any values recited above.

Embodiments of the present invention provide coating compositions that include the aqueous polyurethane/urea dispersion described above. Additional embodiments of the invention provide a coated substrate that includes a substrate and a coating layer of the coating composition, covering at least a portion of a surface of the substrate.

Further embodiments of the present invention provide a method of coating a substrate that includes applying the above-described coating composition to a surface of the substrate. Aspects of this embodiment further provide substrates coated according to the present method.

In an embodiment of the invention, the inventive aqueous dispersion may be blended with other dispersions or with other known additives such as fillers, plasticizers, pigments, carbon black, silica sols and the known levelling agents, wetting agents, antifoaming agents and stabilizers.

In an additional embodiment of the invention, and in order to improve the chemical resistance and hardness of coatings derived from the dispersions according to the invention, they may be blended with colloidal silica in amounts of up to 70% based on the weight of the resulting composition. While not being limited to any single theory, the improvement is believed to be due to the fact that the colloidal silica contains polysilicon dioxide with Si—OH radicals on the surface of each particle. These Si—OH radicals can react with silanes so that a chemical bond exists between the inorganic modified organic matrix and the silica particle. It is believed that this imparts a character to the film, not unlike an elastomer, where hard domains are surrounded by a soft continuous phase. Suitable examples of colloidal silica include those having various particle sizes and surface treatments, such as sodium or ammonium hydroxide.

Non-limiting examples of surface treatments include alkali or acid washing. Alkali washing is preferred for polyurethane/ureas containing anionic groups and acid washing is preferred for polyurethane/ureas containing cationic groups.

In an embodiment of the invention, the aqueous polyurethane/urea dispersions are suitable for coating and impregnating woven and nonwoven textiles, leather, paper, wood, metals, ceramics, stone, concrete, bitumen, hard fibers, straw, glass, porcelain, plastics of a variety of different types, glass fibers for antistatic and crease-resistant finishing. Further to this embodiment, the polyurethane/urea can be used as a binder for nonwovens, adhesives, adhesion promoters, laminating agents, hydrophobizing agents, plasticizers. Also, the polyurethane/urea can be used as a binder for cork powder or sawdust, glass fibers, asbestos, paper-like materials, plastics or rubber waste, ceramic materials. Also, the polyurethane/urea can be used as an auxiliary in textile printing and in the paper industry; as an additive to polymers as sizing agents, for example, for glass fibers; and for finishing leather.

In an embodiment of the invention, drying of the products obtained by various application techniques may be carried out either at room temperature or at elevated temperature. When the products are cured, water evaporates and the silane groups react with one another to form Si—O—Si linkages, which provide additional crosslinking. For this reason the molecular weight of the products does not have to be as high as prior art products to attain similar performance levels. This means that the viscosity of the polyurethane/urea is lower, which means that higher solids products can be obtained or less solvent is necessary.

The invention is further illustrated but is not intended to be limited by the following examples in which all parts and percentages are by weight unless otherwise specified.

EXAMPLES

Silane functional polyurethane dispersions were prepared using the materials in the following table:

| Ingredient | Example 1 | Example 2 |
|---|---|---|
| Charge 1 | | |
| Polyester A<br>1700 Mn (number average molecular weight) polyester diol made from adipic acid, neopentyl glycol (NPG) and hexanediol (HDO) | 46.83 g | |
| Terathane ® 2000<br>1000 equivalent weight,<br>Polytetrahydrofuran, linear polymer available from DuPont | | 55.0 g |
| Polyester B<br>840 Mn polyester made from adipic acid and HDO | 1.05 g | 1.05 g |
| 1,4-butanediol | 17.2 g | 17.2 g |
| N-methylpyrolidone | 50 g | 50 g |
| Charge 2 | | |
| trimethylolpropane | 4.08 g | 4.08 g |
| Dimethylolproprionic acid | 14.96 | 14.96 |

-continued

| Ingredient | Example 1 | Example 2 |
|---|---|---|
| Charge 3 | | |
| Desmodur ® W<br>Hydrogenated MDI diisocyanate with 31.8% NCO and 132 equivalent weight available from Bayer Polymers | 42.29 g | 42.29 g |
| HDI | 16.77 g | 16.77 g |
| 3-isocyanatopropyl triethoxy silane | 16.77 g | 16.77 g |
| Charge 4 | | |
| Triethyl amine | 8.11 g | 8.11 g |
| Charge 5 | | |
| Water | 50 g | 50 g |
| Diethanolamine | 9.36 g | 9.36 g |
| Ethylenediamine | 10.05 g | 10.05 g |
| Solids | 35.5 wt. % | 34.8 wt. % |
| NCO Content | 5.53 wt. % | 5.50 wt. % |
| NMP Content | 5.0 wt. % | 5.0 wt. % |
| PH | 7.3 | 7.2 |
| Viscosity | 115 cps | 110 cps |
| Particle Size | 69 nm | 82 nm |

The % solids, NCO content and NMP content were calculated based on the particular formulation. Viscosity measurements were made using a Brookfield® Viscometer, Brookfield engineering, Inc., Middleboro, Mass., spindle no. 1, 50 rpm at 25° C. at 25° C. Particle size was determined on a HORIBA® LA-910 particle size analyzer available from HORIBA Laboratory Products, Irvine, Calif.

The dispersions were stable for four weeks, meaning that no visible settling of the dispersion or change in viscosity was observed.

Cold rolled steel Q-panels available from Q-panel Company, Farnworth, UK, were prepared using the dispersions of Examples 1 and 2 as coatings. The resin was cast as a 10 mil wet film, which resulted in a 2 mil dry film. In each example, one coated panel was allowed to dry at ambient conditions for one week and another coated panel dried at ambient conditions for 30 minutes and then was placed in a 150° C. oven for ten minutes. All four cured/dried coatings were clear and glossy by visual inspection and flexible as indicated by no visual defects in the coating after bending the panel 180°.

Methyl ethyl Ketone (MEK) double rubs were measured as follows. The ball of a 2 lb ball pein hammer was securely wrapped with several layers of cloth (8"×8" cloth folded twice) and secured using a rubber band. The cloth was saturated with MEK. The wet ball pein hammer was laid on the coating surface, so that the ball pein is at a 90° angle to the surface. Without applying downward pressure, the hammer is pushed back and forth over an approximately 4" long area of the coating. One forward and back motion was counted as 1 double rub. The cloth was resaturated with MEK after every 25 double rubs. The coatings passed 100 MEK double rubs with no deterioration of the coating i.e., clarity and gloss did not visibly change.

The data demonstrate that the coatings obtained were clear, glossy, flexible films with good solvent resistance.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. An aqueous polyurethane/urea dispersion comprising:
i) an aqueous medium and
ii) a polyurethane/urea comprising
  A) at least one alkoxysilane group of formula (I)

$$—X—CO—NR^2—Y—Si—(Z)_3 \qquad (I)$$

wherein
    X is O: each occurrence of $R^2$ is H; Y is selected from $C_1$-$C_8$ linear and branched alkylene; and each occurrence of Z is independently selected from organic groups that are inert to isocyanate groups below 100° C., provided that at least one group is an alkoxy group containing from 1 to 4 carbon atoms; and
  B) anionic and optionally nonionic hydrophilic moieties, wherein the polyurethane/urea comprises the reaction product of a polyisocyanate with an isocyanate-reactive component comprising a polyester or a polycarbonate polyol having a number average molecular weight of at least 500.

2. The polyurethane/urea of claim 1, wherein nonionic hydrophilic moieties are present.

3. The polyurethane/urea of claim 2, wherein the nonionic hydrophilic moieties comprise lateral and/or terminal chains containing alkylene oxide units derived from ethylene oxide.

4. The polyurethane/urea of claim 1, wherein at least 80 wt. % of the anionic groups are carboxylate groups neutralized with a tertiary amine, sodium, potassium and/or lithium ion.

5. The dispersion of claim 1, wherein the polyurethane/urea contains from 0.5 to 6 wt. % of alkoxysilane groups, based on the weight of polyurethane/urea.

6. The dispersion of claim 1, wherein the polyurethane/urea comprises 10 to 120 meq, per 100 grams of polyurethane/urea, of chemically incorporated anionic groups and up to 10% by weight, based on the weight of polyurethane/urea, of nonionic hydrophilic moieties.

7. The dispersion of claim 6, wherein the hydrophilic moieties are selected from lateral and terminal chains containing alkylene oxide units.

8. The dispersion of claim 7, wherein the alkylene oxide units are ethylene oxide.

9. The dispersion of claim 6, wherein at least 80 wt. % of the anionic groups are carboxylate groups neutralized with tertiary amines.

10. A coating composition comprising the aqueous polyurethane/urea dispersion of claim 2.

11. A coated substrate comprising a substrate and a coating layer of the composition of claim 10 covering at least a portion of a surface of the substrate.

12. A method of coating a substrate comprising applying the composition of claim 10 to a surface of the substrate.

13. A substrate coated according to the method of claim 12.

* * * * *